United States Patent
Comte et al.

(10) Patent No.: US 8,759,239 B2
(45) Date of Patent: Jun. 24, 2014

(54) TRANSPARENT, COLORLESS LOW-TITANIA β-QUARTZ GLASS-CERAMIC MATERIAL

(71) Applicants: Marie Jacqueline Monique Comte, Fontenay aux Roses (FR); Lothar Wondraczek, Erlangen (DE)

(72) Inventors: Marie Jacqueline Monique Comte, Fontenay aux Roses (FR); Lothar Wondraczek, Erlangen (DE)

(73) Assignee: Eurokera, Chateau-Thierry (FR)

( * ) Notice: Subject to any disclaimer, the term of this patent is extended or adjusted under 35 U.S.C. 154(b) by 0 days.

(21) Appl. No.: 13/660,666

(22) Filed: Oct. 25, 2012

(65) Prior Publication Data

US 2013/0047672 A1 Feb. 28, 2013

Related U.S. Application Data

(62) Division of application No. 12/516,885, filed as application No. PCT/EP2007/063001 on Nov. 29, 2007, now Pat. No. 8,318,619.

(30) Foreign Application Priority Data

Nov. 30, 2006 (FR) ..................... 06 55231

(51) Int. Cl.
*C03C 3/085* (2006.01)
*C03C 10/12* (2006.01)
*C03C 10/00* (2006.01)
*C03C 3/093* (2006.01)

(52) U.S. Cl.
CPC ............ *C03C 10/0027* (2013.01); *C03C 3/093* (2013.01); *C03C 3/085* (2013.01)
USPC .......... 501/69; 501/4; 501/7; 501/64; 501/67; 65/33.8

(58) Field of Classification Search
USPC .................. 501/4, 7, 64, 67, 69; 65/33.8
See application file for complete search history.

(56) References Cited

U.S. PATENT DOCUMENTS

| | | | | |
|---|---|---|---|---|
| 5,173,453 A | * | 12/1992 | Beall et al. | 501/4 |
| 5,591,682 A | | 1/1997 | Goto | 501/4 |
| 6,750,167 B2 | * | 6/2004 | Kitamura et al. | 501/4 |
| 7,473,660 B2 | * | 1/2009 | Comte | 501/4 |
| 7,476,633 B2 | * | 1/2009 | Comte et al. | 501/7 |
| 7,507,681 B2 | * | 3/2009 | Aitken et al. | 501/4 |
| 2007/0293386 A1 | * | 12/2007 | Goto | 501/4 |
| 2010/0099546 A1 | * | 4/2010 | Aitken et al. | 501/4 |

FOREIGN PATENT DOCUMENTS

| | | | |
|---|---|---|---|
| JP | 1110230 | * | 4/1999 |
| JP | 11228180 | * | 8/1999 |
| JP | 11228181 | * | 8/1999 |
| JP | 2001348250 | * | 12/2001 |

OTHER PUBLICATIONS

Japanese Office Action dated Dec. 28, 2012, sent by Yanagida & Associates.

* cited by examiner

*Primary Examiner* — Karl Group
(74) *Attorney, Agent, or Firm* — Michael W. Russell

(57) ABSTRACT

Transparent, essentially colorless β-quartz glass-ceramic materials, the composition of which is free of $As_2O_3$ and of $Sb_2O_3$, where said composition contains a specific combination of three nucleating agents: $TiO_2$, $ZrO_2$ and $SnO_2$; $TiO_2$ being present in low quantity.

11 Claims, 1 Drawing Sheet

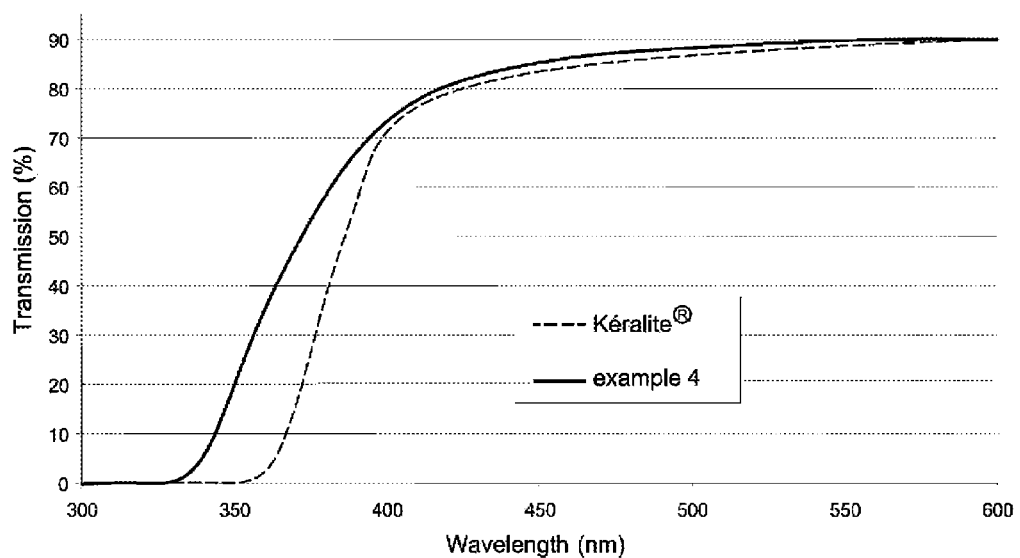

TRANSPARENT, COLORLESS LOW-TITANIA β-QUARTZ GLASS-CERAMIC MATERIAL

CROSS-REFERENCE TO RELATED APPLICATIONS

This is a divisional of U.S. patent application Ser. No. 12/516,885, now U.S. Pat. No. 8,318,619, filed on Mar. 2, 2010, which claims the benefit of priority under 35 U.S.C.§365 of International Patent Application Serial No. PCT/EP07/063001 filed on Nov. 29, 2007 designating the United States of America, which in turn claims the benefit of priority under 35 U.S.C. §119 of French Patent Application Serial No. 0655231 filed Nov. 30, 2006, the contents of which are relied upon and incorporated herein by reference in their entirety.

TECHNICAL FIELD

The present invention relates to glass-ceramic materials in general, precursor glass therefor, articles comprising glass-ceramic material, and process for making glass-ceramic material. In particular, the present invention relates to glass-ceramic materials comprising) β-quartz as the predominant crystalline phase that is essentially transparent and colorless in the visible spectrum, as well as precursor glass material thereof, articles comprising the same and processes for making the same.

BACKGROUND

Transparent glass-ceramic materials with a low thermal expansion coefficient (CTE), which contain a solid solution of β-quartz as the principal crystalline phase, have been described in a number of publications, in particular by W. Hoeland and G. Beall, in "Glass-ceramic technology", Am. Ceram. Soc., Westerville (2002), pages 88-96. Said glass-ceramic materials are generally obtained by heat treating a precursor glass (more conventionally a mixture of the constituents of said glass: a mineral charge, a precursor of such glass), the composition of which is of the $LiO_2$—$Al_2O_3$—$SiO_2$ (LAS) type. Said heat treatment includes a nucleation stage followed by a crystal growth stage.

The manufacture of articles made of β-quartz glass-ceramic conventionally includes the three principal successive steps: a first step of melting a batch material, such as a raw staring materials and/or glass cullet, generally carried out from 1550° C. to 1750° C.; a second step of cooling and forming the molten glass obtained into desired shape; and a third step of crystallizing or ceramizing the shaped cooled glass by a suitable heat treatment (including the phases of nucleation and crystal growth mentioned above).

Glass-ceramic materials comprising β-quartz solid solution as the predominant crystalline phase, having various degree of transparency and essentially colorless, were known. For example, U.S. Pat. Nos. 4,438,210; 5,591,682; 6,677,046; United States Patent Application Publication No. 2004/0198579; GB 2 159 154; EP 0 437 228; JP 2001-348250; DE 199 39 787 and WO 02 162 79; DE 101 10 225; and DE 199 07 038, are all concerned with glass-ceramic materials.

Nonetheless, current commercial products of essentially transparent, essentially colorless glass-ceramic tend to have an undesirable color tint in the visible spectrum. There remains a need of a transparent, colorless glass-ceramic comprising β-quartz solid solution as the predominant crystalline phase.

SUMMARY

A first aspect of the present invention relates to a transparent, essentially colorless glass-ceramic material, comprising a β-quartz solid solution as the predominant crystalline phase, having a composition, expressed in terms of weight percentages on the basis of oxides, consisting essentially of:
   $SiO_2$: >65-71
   $Al_2O_3$: 19-23
   $Li_2O$: 3-4
   $B_2O_3$: 0-1
   $TiO_2$: 0.3-<1.6
   $SnO_2$: 0.25-1.2
   $TiO_2+SnO_2$: <1.8
   $CeO_2$: 0-0.4
   $WO_3+MoO_3$: 0-<1
   $CeO_2+WO_3+MoO_3$: 0-<1
   $Nb_2O_5$: 0-0.6
   $ZrO_2$: 2.2-3.8
   $ZrO_2+TiO_2+SnO_2$: >3.0-<4.8
   $MgO$: 0-2
   $ZnO$: 1-4
   $SrO$: 0-2
   $BaO$: 0-1.8
   $P_2O_5$: 0-3
   $K_2O+Na_2O$: 0-1.5
   $Gd_2O_3+La_2O_3+Ta_2O_5+Y_2O_3$: 0-4
   $Nd_2O_3+Er_2O_3$: 0-0.08
   $Fe_2O_3$: <0.03; and
free of arsenic oxide and antimony oxide, with the exception of unavoidable traces thereof.

In certain embodiments of the glass-ceramic material of the first aspect of the present invention, the glass-ceramic material has a composition, expressed in terms of weight percentages on an oxide basis, consisting essentially of:
   $SiO_2$: 67-70
   $Al_2O_3$: 19.5-<22
   $Li_2O$: 3.2-3.8
   $B_2O_3$: 0-1
   $TiO_2$: 0.3-1.2
   $SnO_2$: 0.3-0.8
   $TiO_2+SnO_2$: <1
   $CeO_2$: 0-0.2
   $Nb_2O_5$: 0-0.2
   $ZrO_2$: 2.2-3.3
   $ZrO_2+TiO_2+SnO_2$: >3.0-<4.4
   $MgO$: 0-1.5
   $ZnO$: 1.3-2.4
   $SrO$: 0-1.2
   $BaO$: 0-1.5
   $K_2O$: 0-1.3
   $Gd_2O_3+La_2O_3+Ta_2O_5+Y_2O_3$: 0-2
   $Nd_2O_3+Er_2O_3$: 0-0.06
   $Fe_2O_3$: <0.02.

In certain embodiments of the glass-ceramic materials of the first aspect of the present invention, which may or may not be embodiments specifically described above, the composition of the glass-ceramic material is further free of halides, with the exception of unavoidable traces thereof.

In certain embodiments of the glass-ceramic materials of the first aspect of the present invention, which may or may not be embodiments specifically described above, the composition of the glass-ceramic material is further free of phosphates, with the exception of unavoidable traces thereof.

A second aspect of the present invention relates to an article made of a glass-ceramic material according to the first aspect of the present invention (including but not limited to the specific embodiments of the first aspect of the present invention described above), such as a cook plate, a cooking utensil, a plate of microwave oven, a fireplace window, a fire door or window, a view window for pyrolysis or catalysis furnace, a lens item, an item of tableware, an architectural element or part of a ballistic protection.

A third aspect of the present invention relates to a lithium aluminosilicate glass, which is a precursor glass of a glass-ceramic material according to the first aspect of the present invention described above (including but not limited to those of the specific embodiments of the first aspect of the present invention described above). The composition of the glass material of the third aspect of the present invention corresponds to the composition of a glass-ceramic material of the first aspect of the present invention.

A fourth aspect of the present invention relates to a method for preparing a glass-ceramic material of the first aspect of the present invention, comprising the heat treatment of a lithium aluminosilicate glass, a precursor of said glass-ceramic material, or of a mineral charge, itself a precursor of such a lithium aluminosilicate glass, under conditions ensuring its cerammization, characterized in that said glass or said mineral charge has a composition which corresponds to that of a glass-ceramic material of the first aspect of the present invention.

In certain embodiments of the method of the fourth aspect of the present invention, the method comprises the following steps in sequence: (i) melting a lithium aluminosilicate glass, or a mineral charge, a precursor of such a glass, said glass or said charge containing an efficient, non-excessive quantity of at least one fining agent; followed by fining the molten glass obtained; (ii) cooling the fined, molten glass obtained and, simultaneously, forming it into desired shape for the intended article; (iii) ceramming said formed glass; characterized in that said glass or said mineral charge has a composition which corresponds to that of a glass-ceramic material according to the first aspect of the present invention (including but not limited to the specific embodiments of the first aspect of the present invention described above).

In certain embodiments of the method of the fourth aspect of the present invention, the method is characterized in that ceramming is implemented for a time of 150 min or less at a temperature of less than 1000° C., advantageously less than 950° C.

One or more embodiments of the various aspects of the present invention have one or more of the following advantages: an essentially colorless, highly transparent glass-ceramic material comprising β-quartz solid solution as the predominant crystalline phase can be made.

Additional embodiments of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawing (FIGURE) shows the transmission curves of (i) a glass-ceramic material according to one embodiment of the present invention (Example 4 below); and (ii) a comparison example (Keralite®, a glass-ceramic material comprising $TiO_2$ described below).

The accompanying drawing (FIG. 1) shows the transmission curves of (i) a glass-ceramic material according to one embodiment of the present invention (Example 4 below); and (ii) a comparison example (Keralite®, a glass-ceramic material comprising $TiO_2$ described below).

DETAILED DESCRIPTION

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Unless otherwise indicated, all numbers such as those expressing weight percents of ingredients, dimensions, and values for certain physical properties such as electrical potential used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, the singular forms "a," "an" and "the" include plural referents unless the context clearly dictates otherwise. Thus, for example, reference to a "glass-ceramic material" includes embodiments having two or more such glass-ceramic materials unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt %" or "weight percent" or "percent by weight" of a component, unless specifically stated to the contrary, is based on the total weight of the composition or article in which the component is included.

The present invention relates to the field of transparent, essentially colorless β-quartz glass-ceramic materials. The subject-matter of the invention is more particularly: (i) novel transparent, essentially colorless β-quartz glass-ceramic materials whose composition is devoid of $As_2O_3$ and $Sb_2O_3$, said composition containing a very specific combination of three nucleating agents: $TiO_2$, $ZrO_2$ and $SnO_2$; the $TiO_2$ content being low; (ii) articles made of said novel glass-ceramic materials; (iii) lithium aluminosilicate glasses, the precursors of said novel glass-ceramic materials, allowing the preparation of said novel, transparent, essentially colorless glass-ceramic materials, with short cerammization times, which is highly advantageous from an economic viewpoint; and (iv)

methods for preparing said novel glass-ceramic materials and said articles made of said novel glass-ceramic materials.

To obtain the desired microstructure (a solid β-quartz and β-eucryptite solution (simply called "β-quartz" in the remainder of this description) in a vitreous matrix), with optimization of said microstructure (optimization regarding the size and distribution of crystallites to obtain translucent, even transparent glass-ceramic materials), usually efficient nucleating agents are used. Generally $TiO_2$ and/or $ZrO_2$ are used. $TiO_2$ is by far the most frequently used nucleating agent, since $ZrO_2$, when used alone, must be used in amounts close to the solubility limit (resulting in a higher melting temperature for the precursor glass, inhomogeneous nucleation, risks of devitrification during processing and/or residual $ZrO_2$-rich areas in the glass-ceramic material). Furthermore, $ZrO_2$ is a much less efficient nucleating agent than $TiO_2$. It requires much longer cerammization times.

To obtain transparent, "essentially colorless" glass-ceramic materials, the presence of coloring sites within said glass-ceramic materials, i.e. the presence of ions or ion pairs which on exposure to visible light may undergo electronic transitions, is to be avoided. However, it is to be noted that under "essentially colorless" is to be understood both "intrinsically essentially colorless" (due to the absence of ions or of ion pairs such as mentioned above) and "essentially colorless due to compensating coloring" by development of a complementary color within the material (see for example the teaching of U.S. Pat. No. 4,093,468). These notions are familiar to persons skilled in the art.

To obtain the desired microstructure (a solid solution of β-quartz and β-eucryptite (simply denoted "β-quartz" in the remainder of the present text) in a vitreous matrix), with optimization of said microstructure (optimization as regards the size and distribution of crystallites, to obtain translucent or transparent glass-ceramic materials), efficient nucleating agents are conventionally used. $TiO_2$ and/or $ZrO_2$ are generally employed as the nucleating agent. $TiO_2$ is by far the most widely used nucleating agent, since $ZrO_2$ alone must be used in amounts which are at the solubility limit (resulting in a higher temperature for melting of the precursor glass, non-homogeneous nucleation, risks of devitrification during the processing and/or zones that are enriched in residual $ZrO_2$ in the glass-ceramic). In any event, $ZrO_2$ is a much less efficient nucleating agent than $TiO_2$. It requires much longer ceramization times.

Further, to obtain "essentially colorless" transparent glass-ceramic materials, the presence in said glass-ceramic materials of coloration sites, i.e. the presence of ions or ion pairs which when exposed to visible light can undergo electronic transitions, should be avoided. However, it should be noted that the term "essentially colorless" means both "intrinsically essentially colorless" (because of the absence of ions or ion pairs, as discussed above) and "essentially colorless due to compensating coloration" by development of a complementary color in the material (see the disclosure in U.S. Pat. No. 4,093,468 mentioned above).

Though it appears the presence in a glass-ceramic of compounds imparting coloration could be avoided by avoiding or minimizing the introduction of said compounds or precursors thereof into the raw materials, the situation becomes more complex when certain necessary components can interact with a color-imparting species in the glass-ceramic material. For example, it is known that while the presence of $Fe_2O_3$ alone (no $TiO_2$) up to contents of the order of 300 ppm in a glass-ceramic is generally not a concern as regards coloration. However, the joint presence of $Fe_2O_3$ and $TiO_2$ generates a characteristic yellowish tint. A number of commercial products which are otherwise known for their high transparency retain this yellowish tint, in particular those sold by the Applicant under the trade name KERALITE® (described in European patent application EP 0 437 228), those sold by Schott AG under the trade name ROBAX® and those sold by Nippon Electric Glass under the trade name NEOCERAM® N-0, because of the joint presence in their compositions of $TiO_2$ and $Fe_2O_3$. Treating the raw materials used to reduce the $Fe_2O_3$ content to below 150 ppm in particular is an expensive operation (an option mentioned in Japanese patent application JP 2001-348250) and it is seen above that $TiO_2$ is the best performing nucleating agent, allowing ceramization to occur on reasonable time scales. To solve the above-mentioned technical problem—obtaining transparent β-quartz glass-ceramic materials with no yellowish coloring—one possible approach appears to be managing without $TiO_2$, or at least minimizing the content thereof, when preparing these glass-ceramic materials.

It is also to be noted that after the first melting step in the method for preparing an article made of □β-quartz glass-ceramic material as specified above, it is expedient to remove the gaseous inclusions as efficiently as possible from the mass of molten glass. For this purpose, at least one fining agent is used. To date, as fining agent, $As_2O_3$ and/or $Sb_2O_3$ have mostly been used (see above). The use of $CeO_2$, $SnO_2$ and other compounds such as halides has also been described. Since $As_2O_3$, the halides and $Sb_2O_3$ are advantageously excluded on account of their toxicity, said halides and $Sb_2O_3$ also being highly volatile, persons skilled in the art chiefly recommend the use of $SnO_2$. On the other hand, $CeO_2$ is known to generate a strong yellow coloring in the presence of $TiO_2$, and the inventors have evidenced the same problem subsequently to $SnO_2$ (and $Nb_2O_5$) interaction with $TiO_2$.

Consequently, it appeared to the inventors that in the composition of a transparent, essentially colorless glass-ceramic material, the presence of $TiO_2$ should advantageously be minimized, or even avoided, not only due to the interaction of $TiO_2$ with $Fe_2O_3$ but also due to the interaction of $TiO_2$ with non-toxic fining agents such as $SnO_2$, $CeO_2$ and $Nb_2O_5$.

Glass-ceramic materials, whose composition does not contain $TiO_2$, have been described (U.S. Pat. Nos. 3,252,811; 3,977,886; and 5,017,519). However, those skilled in the art know that the absence of $TiO_2$ results in long cerammization time, hence higher production costs and the presence of a greater amount of $ZrO_2$, which has the above-mentioned disadvantages.

The technical problem approached by said inventors was therefore to obtain transparent, essentially colorless β-quartz glass-ceramic materials and glass-ceramic material articles (with a low thermal expansion coefficient), from precursor glasses with low $TiO_2$ content and free of undesirable fining agents ($As_2O_3$ and $Sb_2O_3$); and with reasonable cerammization times (unexpectedly this proved to be possible within 150 min or even less).

With reference to said technical problem, the inventors identified a narrow family of glass-ceramic materials of particular interest, whose composition concomitantly contains $TiO_2$, $ZrO_2$ and $SnO_2$ (and optionally $CeO_2$ and/or $WO_3$ and/or $MoO_3$ and/or $Nb_2O_5$).

According to its first aspect, the present invention therefore relates to a transparent, essentially colorless glass-ceramic material containing a solid β-quartz solution as main crystalline phase, having a composition, expressed in terms of weight percentages on an oxide basis, consisting essentially of:

$SiO_2$: >65-71
$Al_2O_3$: 19-23

Li$_2$O: 3-4
B$_2$O$_3$: 0-1
TiO$_2$: 0.3-<1.6
SnO$_2$: 0.25-1.2
TiO$_2$+SnO$_2$: <1.8
CeO$_2$: 0-0.4
WO$_3$+MoO$_3$: 0-<1
CeO$_2$+WO3+MoO$_3$: 0-<1
Nb$_2$O$_5$: 0-0.6
ZrO$_2$: 2.2-3.8
ZrO$_2$+TiO$_2$+SnO$_2$: >3.0-<4.8
MgO: 0-2
ZnO: 1-4
SrO: 0-2
BaO: 0-1.8
P$_2$O$_5$: 0-3
K$_2$O+Na$_2$O: 0-1.5
Gd$_2$O$_3$+La$_2$O$_3$+Ta$_2$O$_5$+Y$_2$O$_3$: 0-4
Nd$_2$O$_3$+Er$_2$O$_3$: 0-0.08
Fe$_2$O$_3$: <0.03;
and, with the exception of unavoidable traces, free of arsenic oxide and antimony oxide.

The terms "transparent" and "essentially colorless" are familiar to those skilled in the art. They are quantified below: Samples of the glass-ceramic materials according to the invention, 3 mm thick, generally have the following values given below for the L* (lightness), a* and b* (color coordinates) parameters in the color space laid down by "CIE 1976 Lab" (International Commission on Illumination, 1976), measured using the standard C illuminator:

L*>90
−2<a*<2
−2<b*<12.

Persons skilled in the art generally acknowledge that an "L*" value of more than 90 is required for high transparency, and an "a*" value of less than 2 is required for a slight yellowish tint. It is observed that a "b*" value of more than 12 is generally associated with an opalescent appearance.

To quantify transparency, the following were measured on samples of the same type (3 mm thick): the lowest wavelengths in which transmission T respectively exceeds 60 and 10%, the difference being calculated to assess opalescence. Results were generally:

$T_{10} \leq 360$ nm $T_{60} \leq 435$ nm, and $T_{60} - T_{10} < 75$ nm.

Also, the thermal expansion coefficient of the glass-ceramic materials according to the invention (measured from 25° C. to 700° C.) generally lies from $-10 \times 10^{-7}$ K$^{-1}$ to $+15 \times 10^{-7}$ K$^{-1}$.

It was indicated that the solid β-quartz solution is present as main crystalline phase. Within the glass-ceramic materials of the invention the residual vitreous phase generally represents less than 35 weight %, and the solid β-quartz solution represents at least 65 weight %, generally from 70 to 85 weight %, of the crystallized fraction. With reference to the crystalline phase of the glass-ceramic materials according to the invention, it can be specified as follows but in no way limited thereto. Generally, said crystalline phase chiefly consists of at least 80 wt. % solid β-quartz or β-eucryptite solution. Said crystalline phase also generally contains minor quantities of secondary crystalline phases, such as phases of srilankite, cubic ZrO$_2$, rutile, possibly in a solid solution with SnO$_2$. Said crystalline phase may also contain tertiary crystalline phases such as a solid solution of β-spodumene (less than 3 wt %) or others (less than 5 wt %).

The crystallite size is generally less than 70 nm, preferably 60 nm or less.

It was indicated that the composition "essentially consists of" the given list of compounds (oxides). This means that in the glass-ceramic materials according to the invention, the sum of the listed compounds (oxides) represents at least 95%, generally at least 98 weight %. It cannot be fully excluded that in said glass-ceramic materials other compounds may be found in low quantities.

With reference to the weight composition of the glass-ceramic materials according to the invention, it can be specified as follows, although in no way limited thereto.

(1) The glass-ceramic materials under consideration are of LAS type. They contain Li$_2$O, Al$_2$O$_3$ and SiO$_2$ as essential constituents of the solid β-quartz solution, which gives them their transparency and low thermal expansion coefficient. The indicated ranges for said essential constituents are narrow. Hence it was determined that: (i) the SiO$_2$ content is more than 65% and no more than 71% to obtain results of interest in terms of characteristics of the end product (high transparency and low thermal expansion coefficient) and in terms of the method for obtaining said end product (melting procedure and cerammization time). The SiO$_2$ content advantageously lies from 67 to 70%; (ii) the Al$_2$O$_3$ content is limited to from 19 to 23%, advantageously from 19.5 and less than 22%. If said Al$_2$O$_3$ content is not high enough (<19%), the transparency of the end product decreases and ceramming becomes too slow. If said Al$_2$O$_3$ content is too high (>23%), melting and ceramming are difficult to implement, and devitrification phenomena can be seen to occur when forming said glass; (iii) the Li$_2$O content is limited to from 3 to 4%, advantageously from 3.2 to 3.8%. A minimum of 3.2% Li$_2$O is necessary to obtain a transparent glass-ceramic material with low thermal expansion coefficient and to minimize cerammization time. If the Li$_2$O content is too high, devitrification phenomena can be seen to occur.

(2) The glass-ceramic materials according to the invention may contain borates. In particular B$_2$O$_3$ may be beneficially used to dissolve ZrO$_2$ and to lower viscosity on melting. However, B$_2$O$_3$ is known to facilitate phase separation and may be responsible for opalescence, for the presence of large crystals and β-spodumene. Therefore the glass-ceramic materials according to the invention do not contain more than 1 weight % B$_2$O$_3$.

(3) As nucleating agents the glass-ceramic materials according to the invention contain: TiO$_2$ (in limited quantities), ZrO$_2$ and SnO$_2$. The amount of these three components are typically:

TiO$_2$: 0.3-<1.6
SnO$_2$: 0.25-1.2
TiO$_2$+SnO$_2$: <1.8
ZrO$_2$: 2.2-3.8
ZrO$_2$+TiO$_2$+SnO$_2$: >3.0-<4.8,

These amounts of these components enable the ceramming (TiO$_2$+SnO$_2$+ZrO$_2$>3%, SnO$_2$ also acting as fining agent); and, most unexpectedly, within short time periods (150 min, or less: see below). It also enables the onset of the yellowish tint to be minimized or even avoided (with the indicated Fe contents) due to the low TiO$_2$ (<1.6%), SnO$_2$ (≤1.2%), TiO$_2$+SnO$_2$ (<1.8%) amounts. In addition, the melting process is fully controlled and the onset of devitrification phenomena is minimized (ZrO$_2$+TiO$_2$+SnO$_2$<4.8%).

In certain embodiments, it is desired that:
TiO$_2$: 0.3-<1.2
SnO$_2$: 0.3-0.8

$TiO_2+SnO_2$: <1
$ZrO_2$: 2.2-3.3
$ZrO_2+TiO_2+SnO_2$: >3.0-<4.4.

Generally, the values in the composition of the glass-ceramic materials according to the invention are most advantageously: $TiO_2$ 0.6%-0.8 wt % and/or 3.5%<$ZrO_2+TiO_2+SnO_2$<4.4%.

(4) $SnO_2$, in addition to its function as nucleating agent, also ensures the function of fining agent. It is recalled that the composition of the glass-ceramic materials according to the invention is free of arsenic oxide and antimony oxide. It was seen above that the content of $SnO_2$ is at least 0.25% (with reference therefore to its efficiency as nucleating agent and fining agent) and is no more than 1.2%, with: $TiO_2$+$SnO_2$<1.8%, and 3.0%<$ZrO_2+TiO_2+SnO_2$<4.8% (with reference to the problems of coloring, nucleation, implementation of the melting process and devitrification). The advantageous and very advantageous conditions of use of $SnO_2$ have already been indicated above.

(5) $CeO_2$, $WO_3$, $MoO_3$ and $Nb_2O_5$ may be used, either alone or in combination, as fining agent. The use of $CeO_2$+$WO_3$+$MoO_3$ is limited to less than 1%. Beyond this value, the onset of a yellowish tint is observed. Advantageously, $WO_3$ and $MoO_3$ are not present and the contents of $CeO_2$ and $Nb_2O_5$ are each limited to 0.2%.

(7) ZnO and the alkaline-earth oxides of the MgO, SrO and BaO group are used to improve the melting properties, to stabilize the vitreous phase and to influence the microstructure of the glass-ceramic material. It is known that SrO and BaO generally remain in the vitreous phase, while Mg is rather incorporated in the solid solution. ZnO also enables the thermal expansion coefficient to be lowered, while MgO, BaO and SrO increase this coefficient. The heavier elements such as Ba and Sr have an impact on the refractive index of the vitreous phase and also on turbidity. It was indicated that the glass-ceramic materials according to the invention contain 0 to 2% MgO, 1% to 4% ZnO, 0 to 2% SrO and 0 to 1.8% BaO. Their MgO content advantageously lies from 0 and 1.5%; their ZnO content from 1.3% to 2.4%; their SrO content from 0 to 1.2%; and their BaO content from 0 to 1.5%.

(8) The glass-ceramic materials according to the invention may also contain 0 to 3% $P_2O_5$. Advantageously they do not contain any phosphates: thereby homogeneity and transparency can so be optimized.

(9) The glass-ceramic materials according to the invention may also contain 0 to 1.5% alkaline oxides other than $Li_2O$, e.g., $Na_2O$ and $K_2O$. Preferably $Na_2O$ is not present. Preferably, $K_2O$ is present alone (at a content of from 0 to 1.3%). After cerammization, the alkaline ions remain in the vitreous phase. They increase thermal expansion and may therefore be used to compensate for too negative thermal expansion coefficient values. They can also be used to lower the melting temperature and to increase $ZrO_2$ dissolution, i.e. to simplify the implementation of the method. If they are used in too great a quantity, thermal expansion will be too strong and nucleation may become difficult to control.

(10) The glass-ceramic materials according to the invention may also contain up to 4% oxides, such as $Gd_2O_3$, $La_2O_3$, $Ta_2O_5$ and $Y_2O_3$ (this list not being truly exhaustive). Said oxides can allow increased transparency and optical appearance of the glass ceramic, by increasing the refractive index of the residual vitreous phase, without coloring said glass ceramic. If they are used in too great a quantity, thermal expansion increases, the refractive index may become too high and the melting step difficult to conduct. Advantageously, the glass-ceramic materials according to the invention do not contain more than 2 weight % of such oxides.

(11) The presence of colorant(s) complementary to the yellow in the glass-ceramic materials according to the invention is not excluded. This aims to improve the desired object: the elimination of any yellowish tinge (by compensation). In particular, use may be made of $Nd_2O_3$ and/or $Er_2O_3$. $Nd_2O_3$ and $Er_2O_3$ must be used in limited quantities, from 0 to 0.08%, advantageously from 0 to 0.06%, further advantageously from 0 to 0.04%. For example, if too much $Nd_2O_3$ is used, a bluish tint is observed; if too much $Er_2O_3$ is used, a pink tint is observed.

(12) Finally, it was specified that the $Fe_2O_3$ content in the glass-ceramic materials according to the invention was less than 300 ppm. Obviously, $Fe_2O_3$ is not voluntarily added as a constitutive glass ingredient. If it is present, it is as an impurity in the raw materials used. Within the context of the invention, $Fe_2O_3$ is only likely to interfere with a limited quantity of $TiO_2$. Generally, it is obviously preferred to minimize the presence of iron but if, for this purpose, the raw materials used have to be purified, then this would often prove to be too costly. Also in some cases the presence of $Fe_2O_3$ can prove to be of interest with respect to melting and fining. Generally, the glass-ceramic materials according to the invention contain 100 to 250 ppm $Fe_2O_3$. Advantageously, the glass-ceramic materials according to the invention contain less than 200 ppm $Fe_2O_3$.

The glass-ceramic materials according to the invention whose composition has just been described above, are also characteristically free of arsenic oxide and antimony oxide, with the exception of unavoidable traces thereof: in this way the use of these undesirable products is avoided.

None of these compounds is therefore voluntarily added as a raw material when preparing the glass-ceramic materials according to the invention.

Quite unexpectedly, it was possible to dispense with the action of said compounds and to limit the $TiO_2$ content in order to prepare glass-ceramic materials meeting the specifications set forth in the introduction hereto (transparent, essentially colorless) β-quartz glass-ceramic materials whose cerammization treatment may last less than 150 min).

The advantageous ranges indicated above are to be considered independently of each other, and also in combination with each other.

The glass-ceramic materials according to the invention advantageously have the following weight composition [i.e. their composition expressed in oxide weight percent essentially consists (in the meaning specified above)] of:

$SiO_2$: 67-70
$Al_2O_3$: 19.5-<22
$Li_2O$: 3.2-3.8
$B_2O_3$: 0-1
$TiO_2$: 0.3-1.2
$SnO_2$: 0.3-0.8
$TiO_2+SnO_2$: <1
$CeO_2$: 0-0.2
$Nb_2O_5$: 0-0.2
$ZrO_2$: 2.2-3.3
$ZrO_2+TiO_2+SnO_2$: >3.0-<4.4
MgO: 0-1.5
ZnO: 1.3-2.4
SrO: 0-1.2
BaO: 0-1.5
$K_2O$: 0-1.3
$Gd_2O_3+La_2O_3+Ta_2O_5+Y_2O_3$: 0-2
$Nd_2O_3+Er_2O_3$: 0-0.06
$Fe_2O_3$: <0.02.

Advantageously, the composition of the glass-ceramic materials according to the invention is also free of halides, with the exception of unavoidable traces. Mention was made above of the problem related to the use of halides (corrosion, pollution). Advantageously therefore, no halide is voluntarily added as a raw material when preparing the glass-ceramic materials according to the invention.

Advantageously, the composition of the glass-ceramic materials according to the invention is free of phosphates, with the exception of unavoidable traces (see above). The presence of phosphates particularly facilitates opalescence. Therefore, advantageously no phosphate is voluntarily added as a raw material when preparing the glass-ceramic materials according to the invention.

Most advantageously, the composition of the glass-ceramic materials according to the invention is also free of halides and phosphates, with the exception of unavoidable traces thereof.

According to its second subject-matter, the present invention relates to articles made of glass-ceramic materials such as described above. Said articles may consist for example in cook plates, cooking utensils, plates for microwave ovens, fireplace windows, fire doors or fire windows, view windows for pyrolysis or catalysis furnaces, lens items, tableware items, architectural elements or parts of ballistic protections.

According to its third subject-matter, the present invention relates to lithium aluminosilicate glasses, the precursors of the glass-ceramic materials according to the invention such as described above. The lithium aluminosilicate glasses with the above-indicated compositions for the glass-ceramic materials according to the invention are effectively novel.

According to its fourth subject-matter, the present invention relates to a method for preparing a glass-ceramic material according to the invention such as described above. Conventionally, said method comprises thermal treatment of a lithium aluminosilicate glass, a precursor of said glass-ceramic material, or of a mineral charge, itself a precursor of such a lithium aluminosilicate glass, under conditions ensuring its cerammization. Said cerammization treatment is known per se.

Characteristically, according to the invention, the method is carried out with a glass or a mineral charge having a weight composition corresponding to that of a glass-ceramic material according to the invention such as specified above.

According to its fifth subject-matter, the present invention relates to a method for manufacturing an article made of a glass-ceramic material according to the invention. Conventionally, said method comprises the following three successive steps: (a) melting a lithium aluminosilicate glass, or a mineral charge, a precursor of such a glass, said glass or said charge containing an efficient, non-excessive amount of at least one fining agent; followed by fining the molten glass obtained; (b) cooling the fined, molten glass obtained and simultaneously forming it to desired shape for the intended article; and (c) ceramming said formed glass.

Characteristically, according to the invention, said glass or said mineral charge under consideration is present in a weight composition which corresponds to that of a glass-ceramic material according to the invention, such as specified above.

The above-mentioned forming (shaping) advantageously consists in rolling between rollers to obtain sheets.

The glass under consideration can be cerammed in 150 min or less.

The ceramming of said formed glass is advantageously conducted for a period of 150 min or less at a temperature of less than 1000° C., advantageously less than 950° C. It quite unexpectedly proved possible to obtain the glass-ceramic material according to the invention with such short cerammization times.

The cerammization time mentioned above corresponds to the time lapsed from the temperature of 650° C. to the maximum ceramming temperature (less than 1000° C.), advantageously from 650° C. to less than 950° C.; said cerammization time corresponds to the nucleation and crystal growth phases.

Said cerammization time does not include the time needed to reach the temperature of 650° C. or the cooling time from the maximum temperature.

It was indicated above that said cerammization time may be 150 min or less. It may even be 120 min or less, even 90 min or less. It most unexpectedly proved possible to obtain the glass-ceramic material according to the invention within these short cerammization times.

As variations of advantageous embodiments of the method according to the invention, the temperature of 650° C. is reached in less than one hour (starting from the temperature of the formed product), most advantageously in less than 30 min; and/or the glass-ceramic material obtained is cooled by at least 40° C. from its maximum ceramming temperature in less than 10 min.

Said invention is illustrated below with the following examples and the appended drawing.

EXAMPLES

To produce 1 kg batches of precursor glass, the raw materials in the proportions (expressed in oxides) given in the first part of Table 1 below were carefully mixed.

The mixtures were placed in platinum crucibles for melting. The filled crucibles were placed in a pre-heated furnace at 1400° C. They underwent the following melting cycle (i) rising temperature up to 1650° C. at a heating rate of 2° C./min; and (ii) holding this temperature of 1650° C. for 12 hours.

The crucibles were then removed from the furnace and the molten glass was poured onto a pre-heated steel plate. It was rolled to a thickness of 4 mm. Approximately 20 cm×30 cm glass plates were obtained. They were annealed at 650° C. for 1 h and then cooled gently.

The glass plates obtained were generally very transparent. They were subjected to a cerammization (crystallization=nucleation+crystal growth) treatment such as specified below. Said glass plates were heated to 650° C. at a heating rate of 30° C./min. They were then heated to 820° C. in 40 min and held at the temperature of 820° C. for 10 min. They were finally heated from said temperature of 820° C. to 900° C. at a heating rate of 10° C./min and held at this temperature of 900° C. for 15 min.

The glass-ceramic materials obtained had the properties indicated in the second part of said Table 1.

The indicated transmissions T were measured on 3 mm thick glass-ceramic material samples. The $T_{10}$ and $T_{60}$ values (expressed in nm) correspond to the lowest wavelengths in which transmission T respectively exceeds 10 and 60%; their difference is indicative of opalescence.

The color points indicated as L*, a* and b* are those mentioned in the introduction hereto (lightness and color coordinates in the "CIE/1976 Lab" space, measured using standard illuminator C). They were assessed on 3 mm thick samples.

The thermal expansion coefficient was measured by horizontal dilatometry (25° C.-700° C.).

The size of the crystals (generated on ceramming) was determined using a conventional X-ray diffraction technique on polished glass-ceramic material samples (Ø=32 mm; thickness=3 mm) Said size was calculated from diffractograms (X-ray) using Rietveld analysis known to those skilled in the art. The indicated values are rounded up or down to the closest tenth (i.e. 34 corresponds to 30 and 57 to 60).

Considering the information contained in said Table 1, the advantage of the present invention is confirmed.

Examples C1 to C5 are comparative examples.

The glass-ceramic material in example C1 is slightly opalescent ($T_{60}$-$T_{10}$ value is very high). Its $TiO_2$ content is too low. Its lightness L* is therefore too weak. Its crystal size is not optimized.

The glass-ceramic material in example C2 is also slightly opalescent ($T_{60}$-$T_{10}$ value is still high). Its $SnO_2$ content is too low. Its crystal size is not optimized.

The "glass-ceramic material" in example C3 is not cerammed, since the $ZrO_2$ content is too low, and since, more generally, the nucleating agent content is too low ($TiO_2$+$ZrO_2$+$SO_2$: 2.9 wt. %).

The glass-ceramic material in example C4 is slightly yellow (which is confirmed by the "a*" color coordinate and $T_{10}$ values), in particular due to the cumulated $TiO_2$ (1.6%) and $SnO_2$ (0.4%) contents: $TiO_2$+$SnO_2$: 2%.

The glass-ceramic material in example C5 is slightly opaque. Its $B_2O_3$ content is too high. Consequently large crystals have developed. Their "harmful" presence shows as said slight opalescence.

Examples 1 to 7 illustrate the invention.

The glass-ceramic material in example 1 contains a relatively high quantity of $SnO_2$ (0.8%). Therefore, relatively high $T_{60}$, $T_{60}$-$T_{10}$ difference and "a*" color coordinate values are observed. However, the result is acceptable.

The glass-ceramic materials in examples 2 and 4 are particularly preferred. They show very low $T_{10}$ values, low $T_{60}$-$T_{10}$ values, low thermal expansion coefficients and a crystal size of particular interest. These good results are obtained with a short cerammization time. This—short—cerammization time is the same (73 min) for all the examples (see above).

The glass-ceramic material in example 3 has a low $TiO_2$ content. Unexpectedly, with such a low $TiO_2$ content, cerammining could be conducted and could even be conducted within the indicated time period. However, with such $T_{60}$-$T_{10}$ and b* color coordinate values, a certain tendency towards opalescence is to be noted. The result nonetheless remains very acceptable.

Example 5 illustrates a variant of a glass-ceramic material according to the invention whose composition is devoid of MgO. The results in terms of color and transmission are excellent. Regarding said transmission, said excellent results can be explained by the crystal size (very small). However, the absence of MgO has an unfavorable impact on the thermal expansion coefficient. The overall result remains very acceptable.

Example 6 illustrates another variant of a glass-ceramic material according to the invention, whose composition is devoid of MgO. Due to the presence of $Ta_2O_5$ the thermal expansion coefficient is higher. Similarly, the b* color coordinate value is close to the "tolerable" limit (12).

The glass-ceramic material in example 7 contains a small quantity of $B_2O_3$. Said small quantity is not detrimental to transparency. This example 7 is to be considered in parallel with comparative example C5. With said small quantity of $B_2O_5$, the crystal size is in the announced preferred range. The glass-ceramic material is highly transparent, colorless and has a thermal expansion coefficient such as announced (of interest).

The accompanying drawing shows the transmission curves (transmission, expressed as a percentage, as a function of wavelength, expressed in nanometers) of two 3 mm (millimeter) thick glass-ceramic samples. The samples were prepared by cutting 32 mm diameter disks from glass-ceramic plates. The disks (4 mm thick) were then polished on both faces to a thickness of 3 mm. One sample was the material of Example 4 ("4" in the drawing) and the other was a comparative glass-ceramic material ("C" in the drawing), which is Keralite®, a $TiO_2$-containing glass-ceramic material disclosed in EP 0 437 228).

It should also be understood that while the present invention has been described in detail with respect to certain illustrative and specific embodiments thereof, it should not be considered limited to such, as numerous modifications are possible without departing from the broad scope of the present invention as defined in the appended claims.

TABLE 1

| | | Examples | | | | | | | | | | |
|---|---|---|---|---|---|---|---|---|---|---|---|---|
| | C1 | C2 | C3 | C4 | C5 | 1 | 2 | 3 | 4 | 5 | 6 | 7 |
| Composition (%) | | | | | | | | | | | | |
| $SiO_2$ | 68.4 | 68.6 | 69.3 | 68.4 | 67.9 | 68.1 | 68.6 | 68.4 | 68.4 | 67.0 | 66.1 | 67.9 |
| $Al_2O_3$ | 20.2 | 20.2 | 20.7 | 20.2 | 19.8 | 20.1 | 20.2 | 20.2 | 20.2 | 20.1 | 19.9 | 19.9 |
| $Li_2O$ | 3.5 | 3.5 | 3.5 | 3.5 | 3.5 | 3.5 | 3.5 | 3.5 | 3.5 | 3.5 | 3.4 | 3.5 |
| MgO | 1.2 | 1.2 | 1.2 | 1.2 | 1.2 | 1.2 | 1.2 | 1.2 | 1.2 | — | — | 1.2 |
| ZnO | 1.6 | 1.6 | 1.6 | 1.6 | 1.6 | 1.6 | 1.6 | 1.6 | 1.6 | 2.0 | 2.0 | 1.6 |
| $TiO_2$ | 0.2 | 0.6 | 0.6 | 1.6 | 1.2 | 0.6 | 0.6 | 0.4 | 1.2 | 1.4 | 1.4 | 1.2 |
| $ZrO_2$ | 3.7 | 3.3 | 1.9 | 2.3 | 2.7 | 3.3 | 3.1 | 3.5 | 2.7 | 2.5 | 2.4 | 2.7 |
| BaO | 0.8 | 0.8 | 0.8 | 0.8 | 0.8 | 0.8 | 0.8 | 0.8 | 0.8 | 1.4 | 0.8 | 0.8 |
| $SnO_2$ | 0. | 0. | 0. | 0. | 0.4 | 0. | 0. | 0. | 0. | 0.3 | 0.3 | 0.4 |
| SrO | 4 | 2 | 4 | 4 | | 8 | 4 | 4 | 4 | 1.0 | 1.0 | |
| $K_2O$ | | | | | | | | | | 0. | 0.8 | |
| $Ta_2O_5$ | | | | | | | | | | 8 | 1.9 | |
| $B_2O_3$ | | | | | 1.2 | | | | | | | 0.8 |
| Properties after ceramming | | | | | | | | | | | | |
| Transmission | | | | | | | | | | | | |
| $T_{10}$ (nm) | 324 | 329 | 302 | 362 | 350 | 347 | 331 | 327 | 344 | 342 | 350 | 344 |
| $T_{60}$ (nm) | 447 | 406 | 332 | 395 | 420 | 414 | 372 | 392 | 383 | 373 | 418 | 382 |
| $T_{60}$ - $T_{10}$ (nm) | 123 | 77 | 30 | 33 | 70 | 67 | 41 | 65 | 39 | 31 | 68 | 38 |
| .Appearance# | SOP | SOP | VTR | SYW | SOP | VTR | VTR | VTR | VTR | VTR | VTR | VTR |
| Color L* | 89.8 | 91.8 | 96.6 | 95.1 | 93.2 | 91.1 | 95.4 | 92.4 | 95.6 | 95.0 | 91.4 | 95.3 |

TABLE 1-continued

| | Examples | | | | | | | | | | | |
|---|---|---|---|---|---|---|---|---|---|---|---|---|
| | C1 | C2 | C3 | C4 | C5 | 1 | 2 | 3 | 4 | 5 | 6 | 7 |
| a* | −0.7 | −0.6 | −0.2 | −1.4 | −1.6 | −0.7 | −0.5 | −0.6 | −0.7 | −0.6 | −1.3 | −0.8 |
| b* | 12.6 | 8.8 | 0.5 | 4.6 | 9.0 | 7.8 | 3.2 | 7.1 | 3.0 | 3.1 | 11.6 | 3.6 |
| CTE (25° C.-700° C.) ($10^{-7}$ $K^{-1}$) | 1.2 | −0.1 | 36.8 | −1.1 | 0.8 | −0.3 | −1.6 | −1.3 | −1.3 | −2.1 | −3.1 | −2.0 |
| Size of β-quartz crystals (nm)## | 60 | 60 | NCR | 40 | 70 | 40 | 50 | 50 | 30 | 20 | 40 | 50 |

SOP: slightly opalescent; VTR: very transparent; SYW: slightly yellow;
NCR: Not crystallized.

The invention claimed is:

1. A lithium aluminosilicate glass material having a composition, expressed in terms of weight percentages on a basis of oxides, consisting essentially of:
   $SiO_2$: >65-71
   $Al_2O_3$: 19-23
   $Li_2O$: 3-4
   $B_2O_3$: 0-1
   $TiO_2$: 0.3-<1.6
   $SnO_2$: 0.25-1.2
   $WO_3+MoO_3$: 0-<1
   $CeO_2-WO_3+MoO_3$: 0-<1
   $ZrO_2$: 2.2-3.8
   $ZrO_2+TiO_2+SnO_2$: >3.0-<4.8
   MgO: 0-2
   ZnO: 1-4
   SrO: 0-2
   BaO: 0-1.8
   $P_2O_5$: 0-3
   $K_2O+Na_2O$: 0-1.5
   $Gd_2O_3+La_2O_3+Ta_2O_5+Y_2O_3$: 0-4
   $Nd_2O_3+Er_2O_3$: 0-0.08
   $Fe_2O_3$: <0.03;
   free of arsenic oxide and antimony oxide, with the exception of unavoidable traces thereof, and containing in an amount great than zero at least one fining agent selected from up to 0.4% $CeO_2$ and up to 0.6% $Nb_2O_5$.

2. A method for forming a glass-ceramic material comprising heat treating the glass material according to claim 1 under conditions effective to ceram the glass material.

3. A method for forming a glass-ceramic article, successively comprising:
   melting the lithium aluminosilicate glass material according to claim 1 together with a non-excessive quantity of at least one fining agent; followed by fining the molten glass obtained;
   cooling the fined, molten glass obtained and, simultaneously, forming it into desired shape for the glass ceramic article; and
   ceramming said formed glass.

4. The method as in claim 3, wherein the glass-ceramic article comprises a β-quartz solid solution as the predominant crystalline phase and has a composition, expressed in terms of weight percentages on a basis of oxides, consisting essentially of:
   $SiO_2$: >65-71
   $Al_2O_3$: 19-23
   $Li_2O$: 3-4
   $B_2O_3$: 0-1
   $TiO_2$: 0.3-<1.6
   $SnO_2$: 0.25-1.2
   $WO_3+MoO_3$: 0-<1
   $CeO_2-WO_3+MoO_3$: 0-<1
   $ZrO_2$: 2.2-3.8
   $ZrO_2+TiO_2+SnO_2$: >3.0-<4.8
   MgO: 0-2
   ZnO: 1-4
   SrO: 0-2
   BaO: 0-1.8
   $P_2O_5$: 0-3
   $K_2O+Na_2O$: 0-1.5
   $Gd_2O_3+La_2O_3+Ta_2O_5+Y_2O_3$: 0-4
   $Nd_2O_3+Er_2O_3$: 0-0.08
   $Fe_2O_3$: <0.03;
   free of arsenic oxide and antimony oxide, with the exception of unavoidable traces thereof, and containing in an amount greater than zero at least one fining agent selected from up to 0.4% $CeO_2$ and up to 0.6% $Nb_2O_5$.

5. The method as in claim 3, wherein the ceramming is implemented for a time of 150 min or less at a temperature of less than 1000° C.

6. The method as in claim 3, wherein the glass-ceramic article is selected from the group consisting of a cook plate, a cooking utensil, a plate of a microwave oven, a fireplace window, a fire door or window, a view window for pyrolysis or catalysis furnace, a lens item, an item of tableware, an architectural element and a part of a ballistic protection.

7. The lithium aluminosilicate glass material as in claim 1, wherein the composition includes at most 0.2% of $CeO_2$ or $Nb_2O_5$.

8. A glass plate comprising the lithium aluminosilicate glass material as in claim 1.

9. The glass plate according to claim 8, wherein the glass plate is transparent.

10. A lithium aluminosilicate glass material having a composition, expressed in terms of weight percentages on a basis of oxides, comprising:
   $SiO_2$: >65-71
   $Al_2O_3$: 19-23
   $Li_2O$: 3-4
   $B_2O_3$: 0-1
   $TiO_2$: 0.3-<1.6
   $SnO_2$: 0.25-1.2
   $WO_3+MoO_3$: 0-<1
   $CeO_2+WO_3+MoO_3$: 0-<1
   $ZrO_2$: 2.2-3.8
   $ZrO_2+TiO_2+SnO_2$: >3.0-<4.8
   MgO: 0-2
   ZnO: 1-4
   SrO: 0-2
   BaO: 0-1.8
   $P_2O_5$: 0-3
   $K_2O+Na_2O$: 0-1.5
   $Gd_2O_3+La_2O_3+Ta_2O_5+Y_2O_3$: 0-4

$Nd_2O_3+Er_2O_3$: 0-0.08
$Fe_2O_3$: <0.03;
wherein the composition is free of arsenic oxide and antimony oxide, and contains at least one fining agent selected from up to 0.4% $CeO_2$ and up to 0.6% $Nb_2O_5$.

11. The lithium aluminosilicate glass material as in claim 10, wherein the composition is free of $WO_3$ and $MoO_3$.

* * * * *